(12) United States Patent
Clarke et al.

(10) Patent No.: US 12,026,660 B2
(45) Date of Patent: Jul. 2, 2024

(54) SECURED CONTAINER SYSTEM FOR UNATTENDED DELIVERIES

(71) Applicant: OCADO INNOVATION LIMITED, Herts (GB)

(72) Inventors: Paul Clarke, Herts (GB); Andrew John Ingram-Tedd, Herts (GB); Pawel Karolinczak, Herts (GB)

(73) Assignee: OCADO INNOVATION LIMITED, Hatfield (GB)

( * ) Notice: Subject to any disclaimer, the term of this patent is extended or adjusted under 35 U.S.C. 154(b) by 1645 days.

(21) Appl. No.: 15/777,378

(22) PCT Filed: Nov. 21, 2016

(86) PCT No.: PCT/EP2016/078312
§ 371 (c)(1),
(2) Date: May 18, 2018

(87) PCT Pub. No.: WO2017/085316
PCT Pub. Date: May 26, 2017

(65) Prior Publication Data
US 2021/0201619 A1 Jul. 1, 2021

(30) Foreign Application Priority Data
Nov. 20, 2015 (GB) .................................. 1520522
Jan. 25, 2016 (GB) .................................. 1601294
(Continued)

(51) Int. Cl.
G06Q 10/087 (2023.01)
A47G 29/14 (2006.01)
(Continued)

(52) U.S. Cl.
CPC ............ *G06Q 10/087* (2013.01); *A47G 29/14* (2013.01); *A47G 29/141* (2013.01); *B60P 3/007* (2013.01);
(Continued)

(58) Field of Classification Search
CPC .... G06Q 10/087; G06Q 10/08; G06Q 10/083; G06Q 30/0207; G06Q 50/28;
(Continued)

(56) References Cited

U.S. PATENT DOCUMENTS 4,183,708 A * 1/1980 Kuhbier .................... B60P 3/03
414/498
4,193,511 A * 3/1980 Taber ........................ B25J 1/04
193/8
(Continued)

FOREIGN PATENT DOCUMENTS

EP 2 441 327 A1 4/2012
GB 2 488 164 A 8/2012
(Continued)

OTHER PUBLICATIONS

Office Action (Communication) dated Nov. 26, 2021, by the European Patent Office in corresponding European Patent Application No. 16801172.4. (5 pages).
(Continued)

Primary Examiner — Saul Rodriguez
Assistant Examiner — Ashley K Romano
(74) Attorney, Agent, or Firm — BUCHANAN INGERSOLL & ROONEY PC

(57) ABSTRACT

A secured container is can be configured to accept deliveries of goods, parcels or other items ordered by a user. The container is secured such that a delivery may be made whist the delivery location is unattended whilst ensuring the delivery is safe. The secured container may be accessed by
(Continued)

autonomous vehicles such as drones or quadcopters or other flying platforms.

9 Claims, 18 Drawing Sheets

(30) Foreign Application Priority Data

Feb. 26, 2016 (GB) ...................................... 1603419
Feb. 26, 2016 (GB) ...................................... 1603420

(51) Int. Cl.
| | |
|---|---|
| B60P 3/00 | (2006.01) |
| B64C 39/02 | (2023.01) |
| B64F 1/32 | (2006.01) |
| B65G 11/04 | (2006.01) |
| G01C 21/34 | (2006.01) |
| G05D 1/00 | (2006.01) |
| G05D 1/02 | (2020.01) |
| G06Q 10/08 | (2023.01) |
| G06Q 10/083 | (2023.01) |
| G06Q 30/0207 | (2023.01) |
| G07F 17/12 | (2006.01) |
| B64U 101/60 | (2023.01) |

(52) U.S. Cl.
CPC .............. *B64C 39/024* (2013.01); *B64F 1/32* (2013.01); *B65G 11/04* (2013.01); *G01C 21/3453* (2013.01); *G05D 1/0094* (2013.01); *G05D 1/0202* (2013.01); *G05D 1/021* (2013.01); *G06Q 10/08* (2013.01); *G06Q 10/083* (2013.01); *G06Q 30/0207* (2013.01); *G07F 17/12* (2013.01); *B64U 2101/60* (2023.01)

(58) Field of Classification Search
CPC ....... A47G 29/14; A47G 29/141; B60P 3/007; B64C 39/024; B64C 2201/128; B64F 1/32; B65G 11/04; G01C 21/3453; G05D 1/0094; G05D 1/0202; G05D 1/021; G07F 17/12
See application file for complete search history.

(56) References Cited

U.S. PATENT DOCUMENTS

| | | | | |
|---|---|---|---|---|
| 4,297,071 A | * | 10/1981 | Dunbar ................... | B60P 1/36 414/542 |
| 4,678,390 A | * | 7/1987 | Bonneton ............ | B65G 1/1375 414/416.03 |
| 5,413,448 A | * | 5/1995 | Peshkin ................ | B65F 1/1468 414/679 |
| 6,082,953 A | * | 7/2000 | Darley ..................... | B60P 3/03 414/398 |
| 2002/0095269 A1 | | 7/2002 | Natalini et al. | |
| 2005/0119786 A1 | * | 6/2005 | Kadaba ............ | G07B 17/00467 700/224 |
| 2007/0112461 A1 | | 5/2007 | Zini et al. | |
| 2008/0109295 A1 | | 5/2008 | McConochie et al. | |
| 2009/0119142 A1 | | 5/2009 | Yenni et al. | |
| 2010/0292961 A1 | | 11/2010 | Moss | |
| 2011/0084162 A1 | | 4/2011 | Goossen et al. | |
| 2012/0090110 A1 | | 4/2012 | Van Den Berg et al. | |
| 2012/0316984 A1 | | 12/2012 | Glassman | |
| 2014/0032034 A1 | | 1/2014 | Raptopoulous et al. | |
| 2014/0101058 A1 | | 4/2014 | Castel et al. | |
| 2015/0006005 A1 | * | 1/2015 | Yu .......................... | G06Q 50/28 701/22 |
| 2015/0268281 A1 | | 9/2015 | Haghighat-Kashani | |
| 2015/0321595 A1 | | 11/2015 | Hempsch et al. | |
| 2015/0366411 A1 | | 12/2015 | Yang et al. | |
| 2016/0068264 A1 | * | 3/2016 | Ganesh .............. | G06Q 30/0637 701/4 |
| 2016/0107750 A1 | * | 4/2016 | Yates .................... | B64C 39/024 244/2 |
| 2016/0364679 A1 | * | 12/2016 | Cao ........................ | G06Q 50/30 |

FOREIGN PATENT DOCUMENTS

| | | | |
|---|---|---|---|
| WO | WO 2007/047510 A2 | 4/2007 | |
| WO | WO 2008/085547 A2 | 7/2008 | |
| WO | WO 2015/061008 A1 | 4/2015 | |
| WO | WO 2015/195706 A1 | 12/2015 | |
| WO | WO 2017/027780 A1 | 2/2017 | |

OTHER PUBLICATIONS

International Search Report (PCT/ISA/210) dated Dec. 23, 2016, by the European Patent Office as the International Searching Authority for International Application No. PCT/EP2016/078312.
Written Opinion (PCT/ISA/237) dated Dec. 23, 2016, by the European Patent Office as the International Searching Authority for International Application No. PCT/EP2016/078312.
International Search Report (PCT/ISA/210) dated Dec. 23, 2016, by the European Patent Office as the International Searching Authority for International Application No. PCT/EP2016/078309.
Written Opinion (PCT/ISA/237) dated Dec. 23, 2016, by the European Patent Office as the International Searching Authority for International Application No. PCT/EP2016/078309.
International Search Report (PCT/ISA/210) dated Dec. 23, 2016, by the European Patent Office as the International Searching Authority for International Application No. PCT/EP2016/078326.
Written Opinion (PCT/ISA/237) dated Dec. 23, 2016, by the European Patent Office as the International Searching Authority for International Application No. PCT/EP2016/078326.
Patents Act 1977: Search Report Under Section 17 dated Jul. 25, 2016, issued by the Great Britain Intellectual Property Office in the corresponding Great Britain Application No. GB1601294.0. (5 pages).

* cited by examiner

SECURED CONTAINER SYSTEM FOR UNATTENDED DELIVERIES

The present invention relates to a secured container system for unattended deliveries. More specifically but not exclusively it relates to a system or device that enables deliveries to be made to secured locations in the absence of a user.

This application claims priority from UK Patent Application Nos. GB1520522.2 filed on 20 Nov. 2015, GB1601294.0 filed on 25 Jan. 2016 and GB1603419.1 and GB1603420.9 filed on 26 Feb. 2016, the entire contents of which are hereby incorporated by reference.

Small autonomous delivery vehicles which can carry a single delivery to a customer's front door are known. Such known vehicles are generally autonomous, electric vehicles. The vehicles are quiet and can travel at pedestrian speeds for short distances for between 5 and 30 minutes to deliver small loads, for example groceries, to at least one customer. The vehicle may be fitted with several cameras and may be in continuous communication via the internet with a remotely located operator. The vehicle is substantially self-driving however in particularly difficult situations the remote operator may be able to override the self-driving facility as required.

When the vehicle reaches a predetermined destination if the customer is present a mobile phone may be used to open the robot and access the delivered goods.

It is a disadvantage of this prior art system as described above that a customer must be available to receive the delivered goods, and manually lift them from the vehicle's storage compartment. For disabled or elderly or frail customers manually lifting the delivered goods from the autonomous vehicle's storage compartment may be difficult or impossible.

Hence a need exists for a quiet autonomous delivery vehicle which can locate a delivery site and autonomously dispense the order for subsequent, easy retrieval by the customer.

According to the invention there is provided a secured container for receiving deliveries of goods associated with a user, the secured container defining a cavity, the container further comprising a portion moveable from a first position in which the cavity is inaccessible, to a second position in which the cavity is externally accessible, the moveable portion being provided with releasable securing means, the container being further provided with signal receiving means, the releasable securing means acting so as to prevent the portion from being moved from the first position to the second position, the securing means being releasable on the signal receiving means receiving a signal from transmitting means associated with an autonomous delivery vehicle, at least a portion of the cavity being accessible to at least a portion of the delivery vehicle, the container further comprising means for storing goods carried by the vehicle securely until accessed by a user, the portion being moveable from the first position to the second position in response to the receiving means receiving a signal, to accept the delivery from the autonomous vehicle in to the cavity, the moveable portion returning from the second position to the first position once the delivery is complete and the delivery vehicle is no longer in the vicinity of the container.

According to the invention there is further provided a secured container for receiving a delivery of goods for a user, the secured container comprising a box having a releasably openable side, the side being operable in response to a signal transmitted from a remote location, the container, when the side is in an open position being adapted to accept the delivery from delivery means, the container further being adapted to be an integrally formed part of the delivery location, thereby ensuring goods located within the container are accessible only to the specific user associated with the delivery location.

In a preferred aspect the autonomous delivery vehicle travels from the delivery site to another delivery site before returning to the delivery hub.

In a further preferred aspect of the invention, the delivery vehicle comprises a wheeled vehicle.

In yet a further preferred aspect of the invention, the delivery vehicle comprises an unmanned drone platform.

In this way, the present invention overcomes the problems of the prior art and provides a secured delivery area associated with a user that may be accessed by autonomous delivery vehicles including wheeled, tracked and propeller driven vehicles and platforms. The autonomous delivery platform can make deliveries to a desired secure location from which the customer can then retrieve the delivery at their convenience, there is no need for the customer to be present at the delivery location.

The invention will now be described with reference to the accompanying diagrammatic drawings in which FIG. 1a is a schematic perspective view of an autonomous vehicle in accordance with one form of the invention, the vehicle containing boxes or the like for delivery to a customer;

FIG. 7b shows a schematic perspective view from a second direction of the autonomous vehicle of FIG. 7a;

Figure 11:
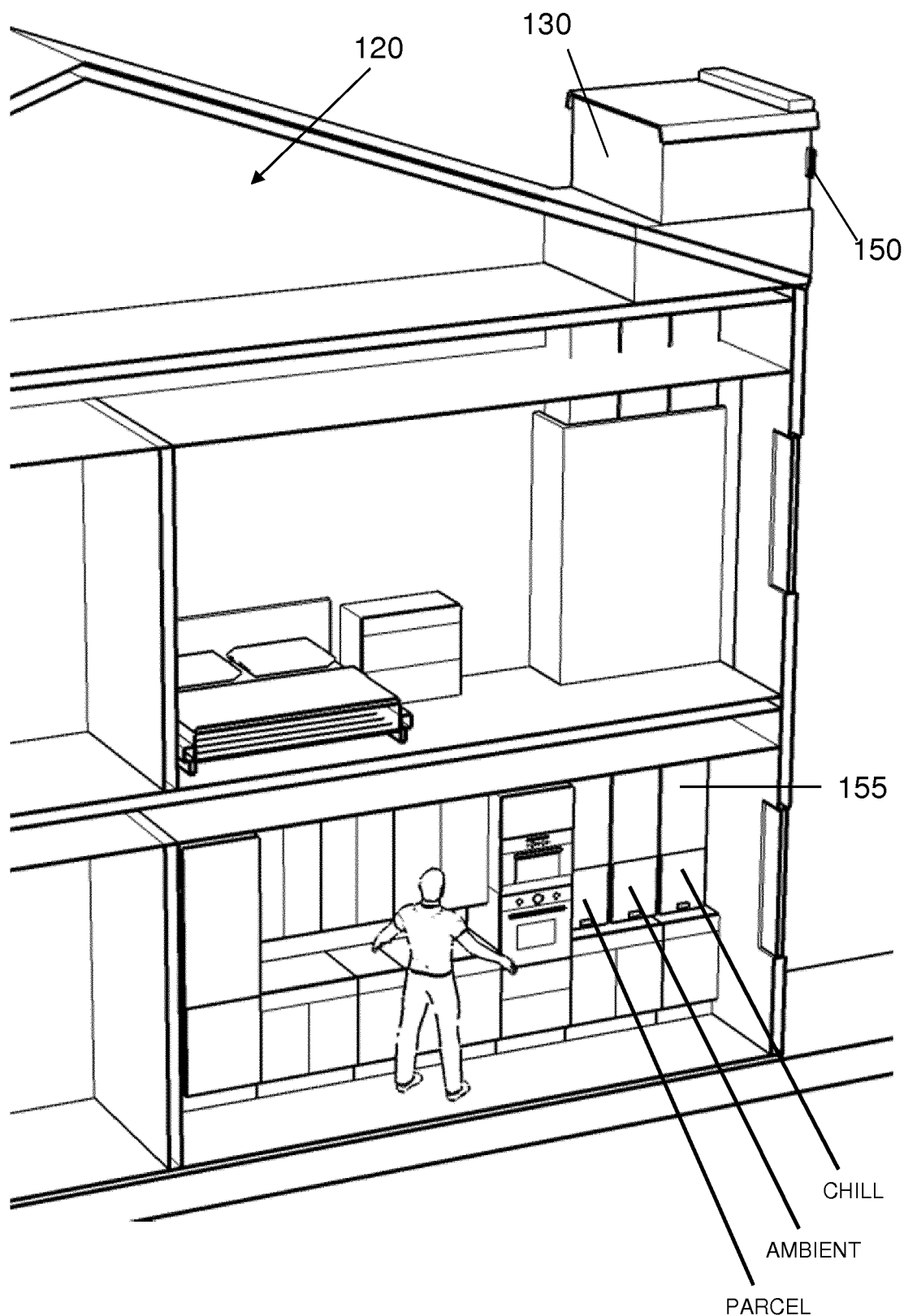
Figure 12A:
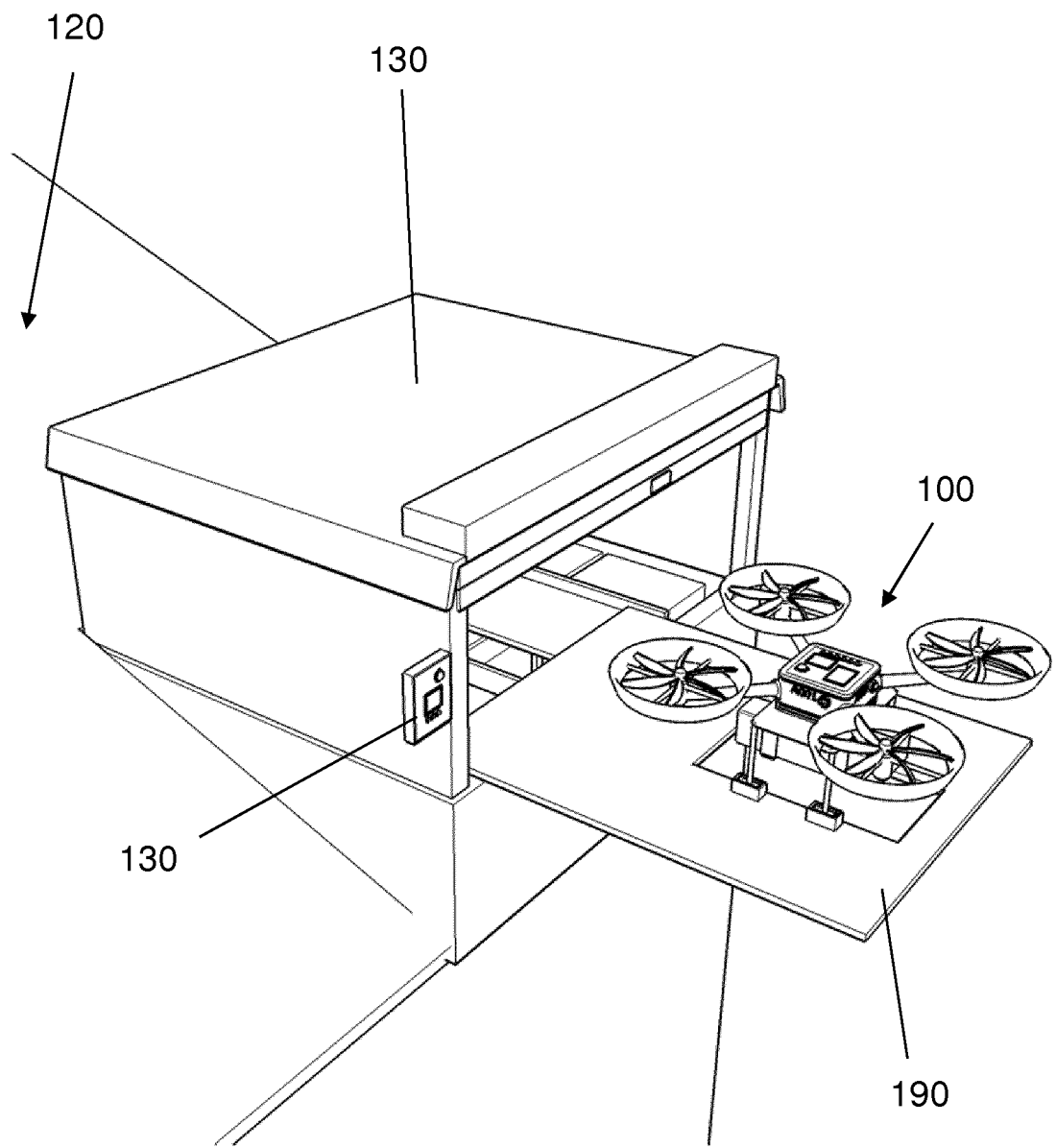
Figure 12B:
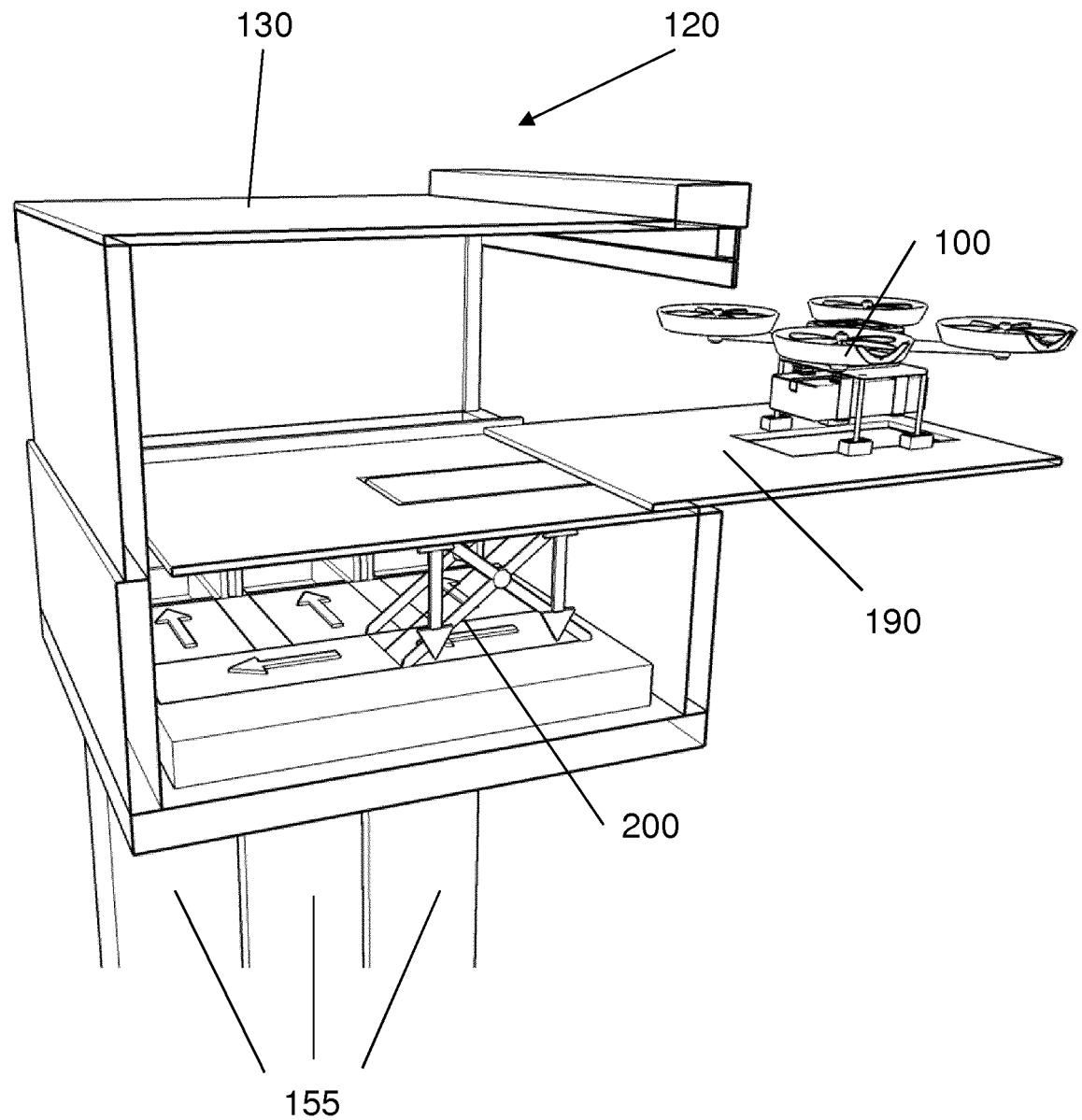

FIG. 11 shows a schematic perspective representation of the interior of one delivery address, the securable drop off area being directly connected to the kitchen of the address by suitable chute means; and FIG. 12a shows a cut away perspective view of one form of securable drop off area showing one form of mechanism for allowing the autonomous vehicle of FIG. 7 to enter and deliver an order, the order being deliverable to the interior of the building by suitable chute means; and FIG. 12b shows a cut away perspective view of another form of securable drop off area showing one form of sorting mechanism for sorting different deliveries in to different chute means.

In a first form of the invention, as shown in FIG. 1 the autonomous delivery vehicle 1 comprises a vehicle body 6 mounted on wheels 5. The vehicle body 6 comprises one or more storage compartments 2.

Each compartment 2 is shaped and sized to receive items 8, said items 8 comprising goods ordered or to be delivered to a customer for example, one or two bags of groceries, a parcel or other items comprising a single customer order. The vehicle 1 further comprises ramp means 3, the ramp means 3 enabling the items 8 located in the or each compartment 2 to be automatically, and/or under remote control, deposited by the vehicle 1 at a predetermined location.

The item or items 8 for delivery are retained in a container such as a reusable or recyclable bin, crate, box, or bag or like or a holder which is placed in the storage compartment 2. It will be appreciated that the container may be any suitable form of container and is not limited to these examples. Furthermore, some items for delivery may not require containers, for example parcels shipped by online retailers in boxes need not be placed in an additional container.

It will further be appreciated that container 8 may comprise an insulated material to maintain the temperature of the contents of the container. Optionally, the container may comprise cooling means such as, by way of example only, a chilled or frozen ice-pack containing a coolant fluid. In an especially preferred embodiment the iced pack may be frozen water.

Individual orders placed by customers, or parcels for delivery are pre-loaded into containers 8 at a delivery hub.

One or more containers 8 may be loaded into the or each compartment 2 of the delivery vehicle 1 at the delivery hub.

The delivery vehicle 1 then travels autonomously to the delivery location.

On reaching the delivery site the one or more compartment 2 opens automatically and dispenses the one or more containers contained therein automatically to, at, in or onto the customer's desired location.

By way of example only the desired location may be at the customers door step or at the side of his property or behind a wall or the like in a location where the container will be substantially concealed from the view of passers-by.

Figure 2A:
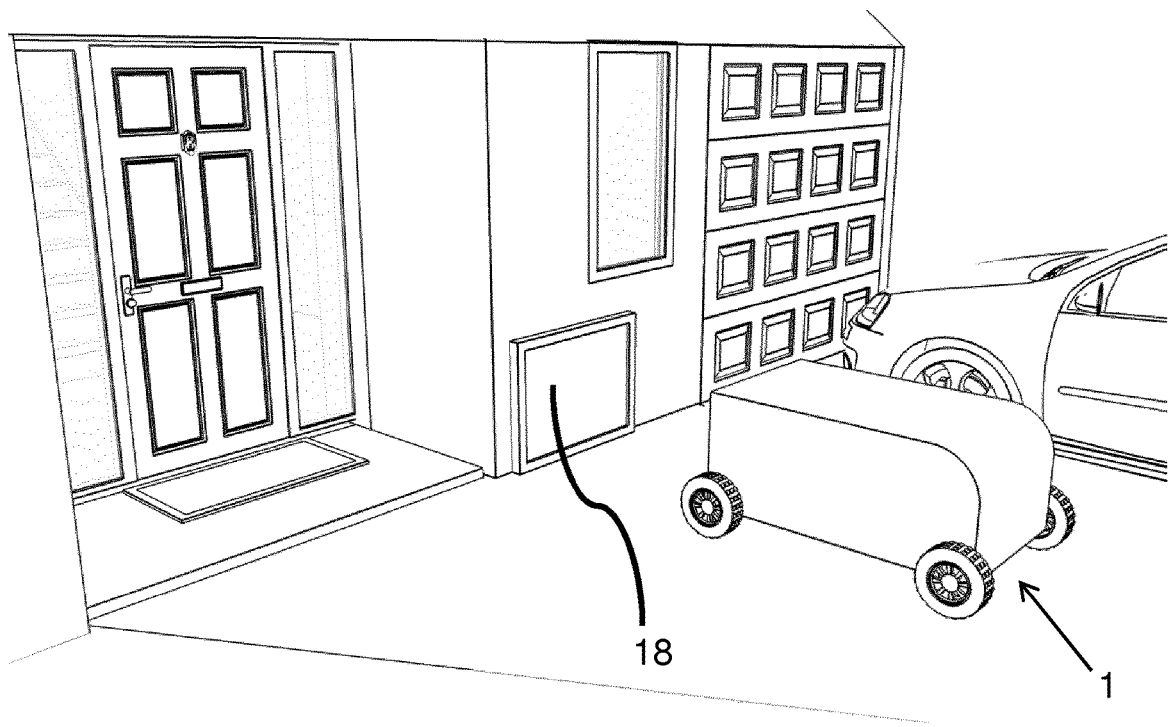
FIGS. 2a and 2b show schematic perspective views of a vehicle approaching a customer's chosen location to perform an unattended delivery in to secure location.
Figure 2B:
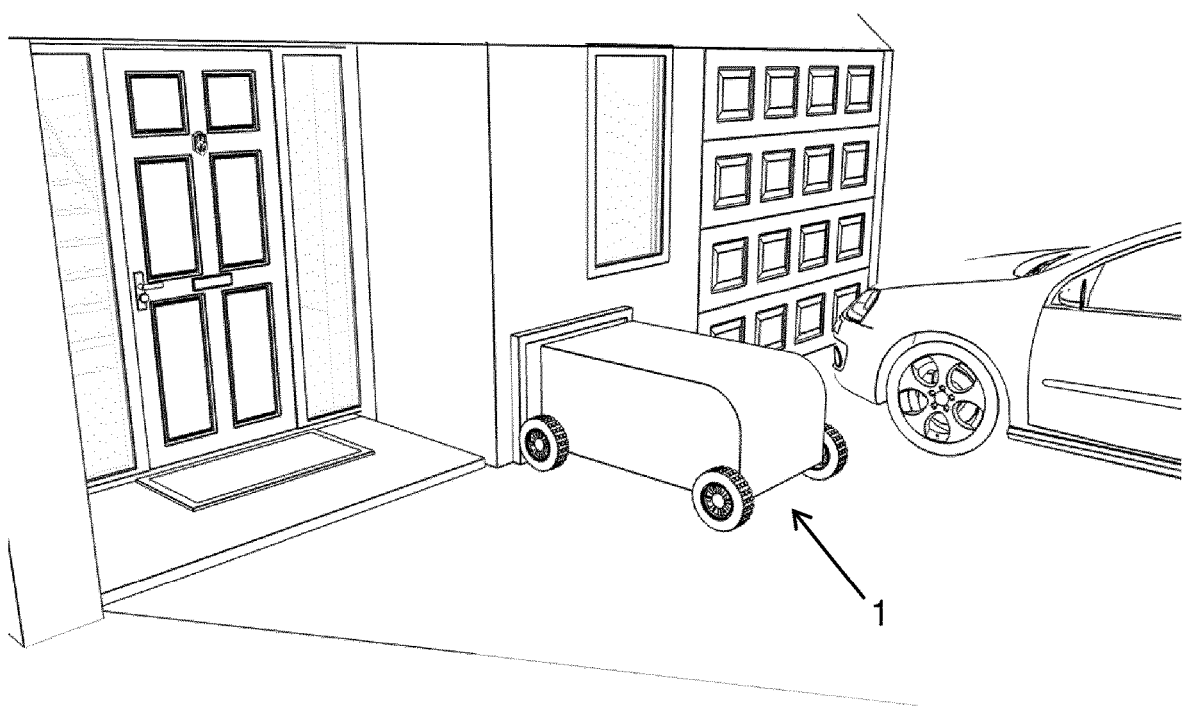
Figure 2C:
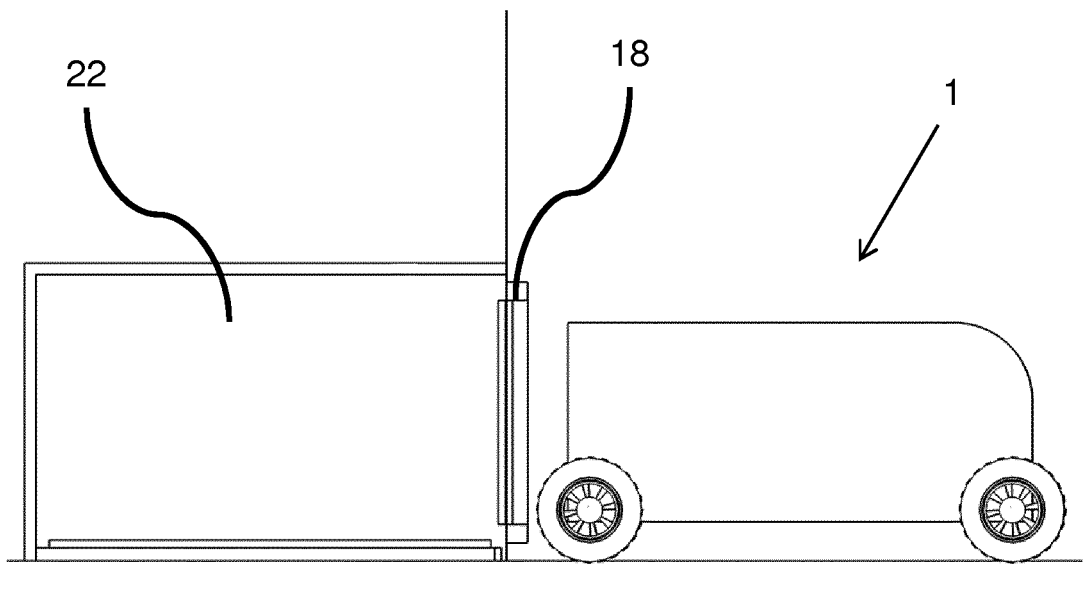
FIGS. 2c, 2d, 2e and 2f show schematic cross sectional views of the vehicle of FIG. 3, the ramp means engaging with secure unattended delivery means enabling the contents of the vehicle to be deposited to a secure location.
Figure 2D:
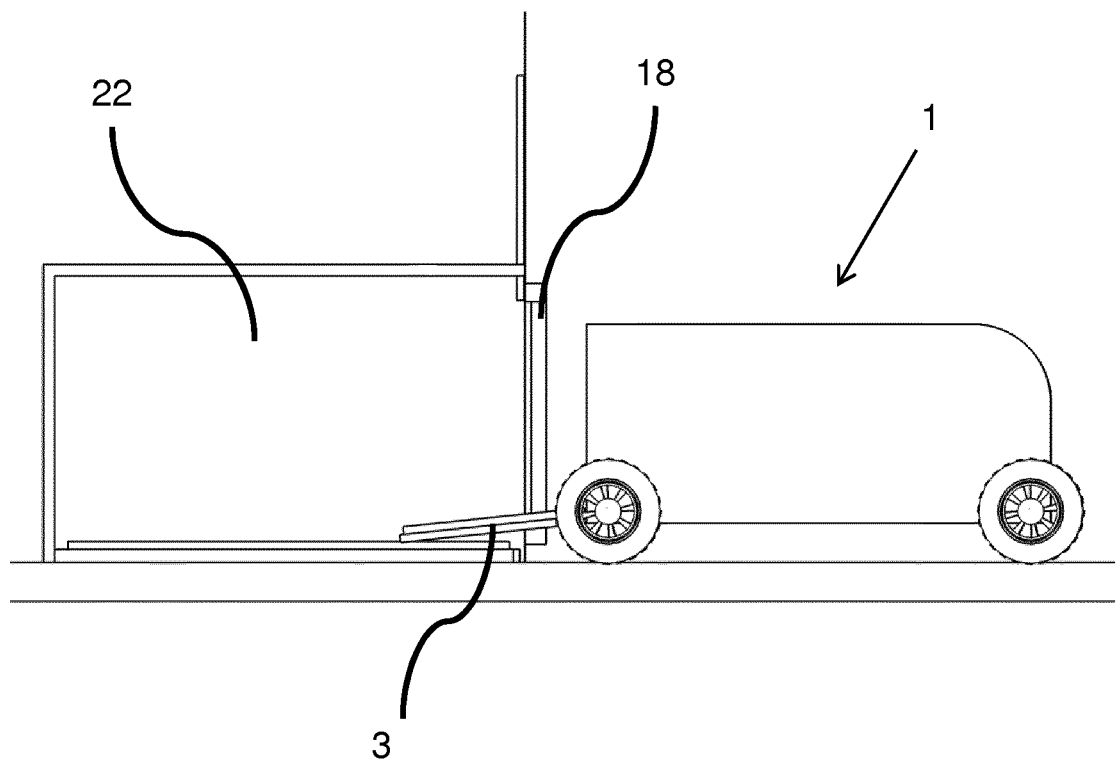
Figure 2E:
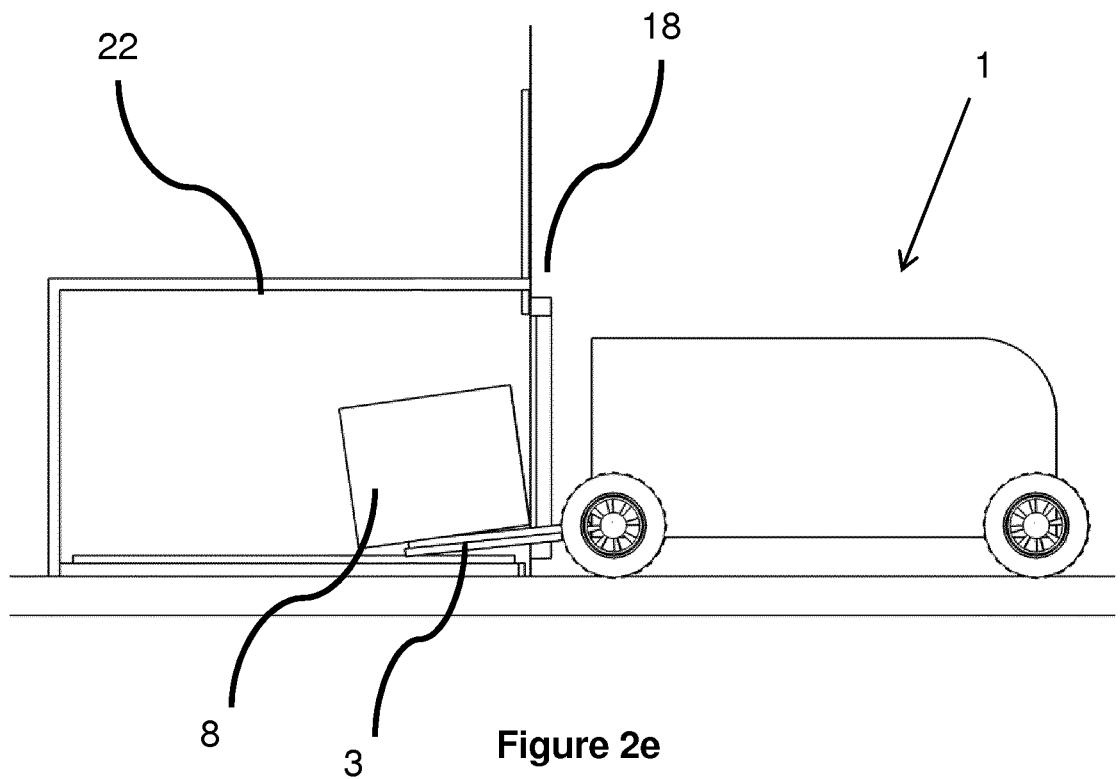
Figure 2F:
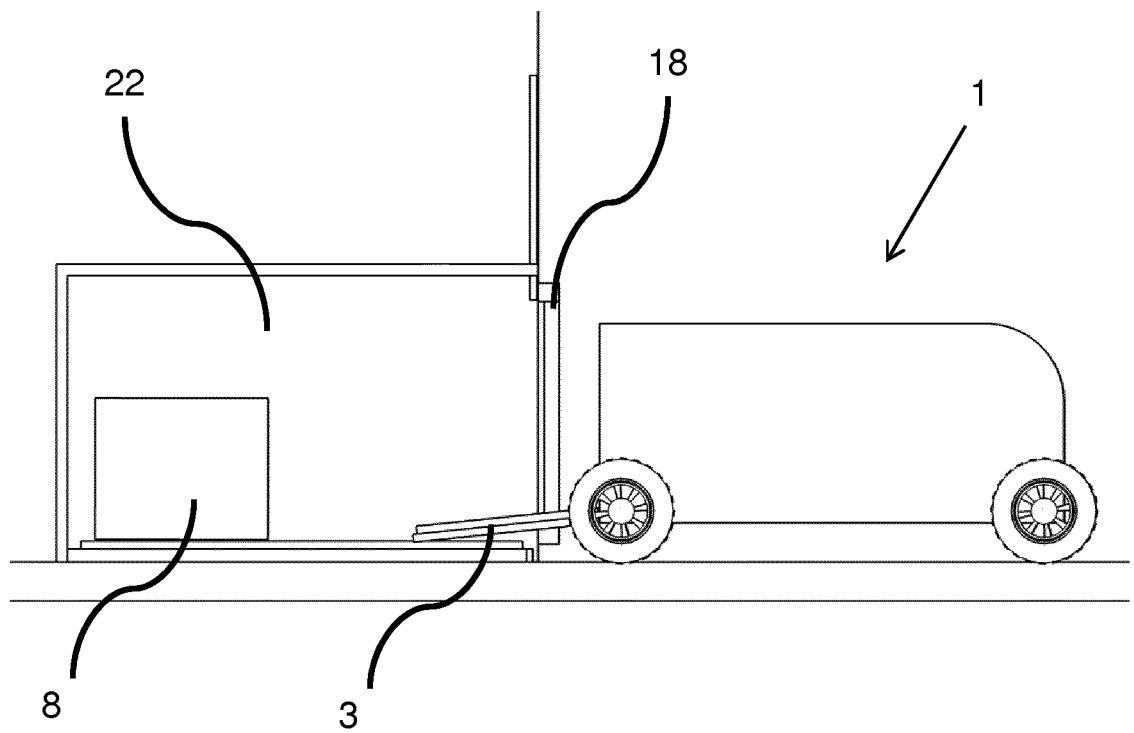

As shown in FIGS. 2a and 2b, the delivery location may comprise a securable area within or adjacent to a customer's property. For example, the property may be provided with a normally locked door 20 that when engaged by the flap 3 of the vehicle 1 enables the items 8 to be delivered in to a secure location. As the vehicle 1 leaves the delivery location, the door 20 locks again, thereby securing the delivery.

Alternatively in locations where additional security is required the delivery may be made into a locking, receiving box located at the customer's desired location within the delivery site.

When the autonomous vehicle approaches the delivery box which corresponds with the order to be delivered the box is automatically unlocked and the autonomous vehicle 1 enters the delivery box dispenses the order and exits the box which is locked after the autonomous vehicle has exited.

Optionally a message may then be sent to the customer advising that the order has been delivered. The customer can then retrieve the order from the desired location at their convenience.

It will be appreciated that this gives the customer the ability to securely receive delivery items to unattended locations. This may be particularly relevant for high value items such as electronic goods or clothes or for items carrying an age limit for purchase.

Once the delivery has occurred, the one or more compartment 2 closes automatically and the autonomous delivery vehicle 1 travels to a second delivery site and repeats the process dispensing the one or more containers contained in a second compartment 2 to complete a second delivery.

Alternatively, the autonomous delivery vehicle 1 returns to the delivery hub where each of the one or more compartments 2 is reloaded with one or more containers and if necessary the vehicle 1 recharged with power.

Figure 1A:
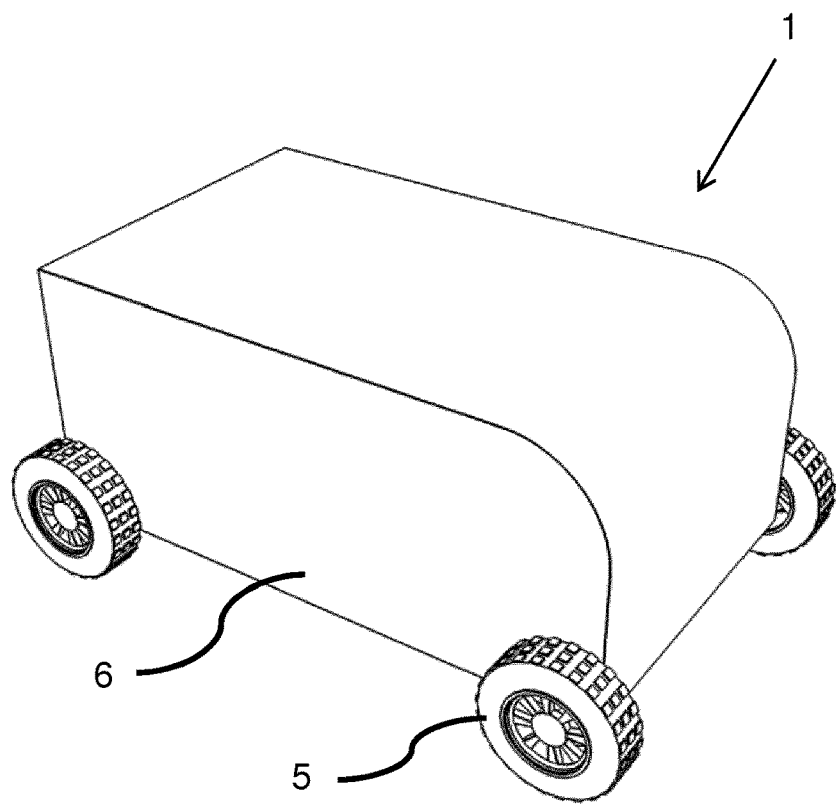
FIG. 1b is a cut-away schematic view of the vehicle of FIG. 1a showing one possible form of interior of the vehicle, the vehicle carrying, for example, two containers for delivery.
Figure 1B:
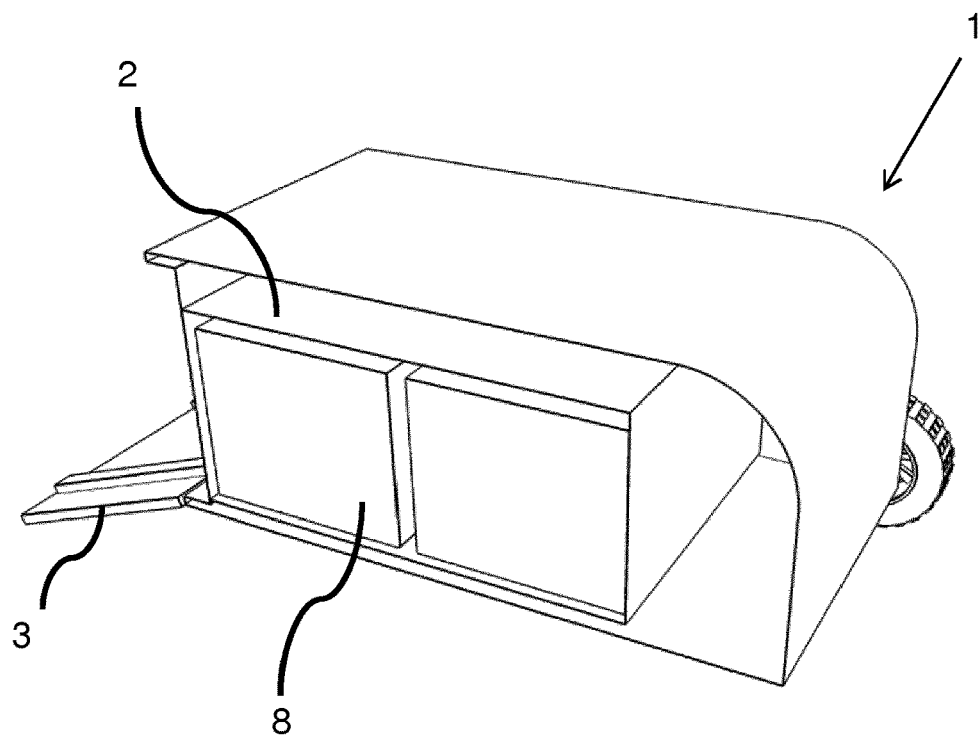

In the example described above, the one or more compartment 2 is opened and closed by a panel or flap 3 which moves from a first closed position shown in FIG. 1a to a second open position shown in FIG. 1b. In the open position the one or more container is ejected from the or each compartment 2. The one or more containers can be ejected or dispensed from the compartment 2 by way of example only by tipping the compartment so that the one or more containers roll or slide out of the compartment, or by tipping the autonomous vehicle 1 itself so that the one or more containers roll or slide out of the compartment 2.

Figure 3A:
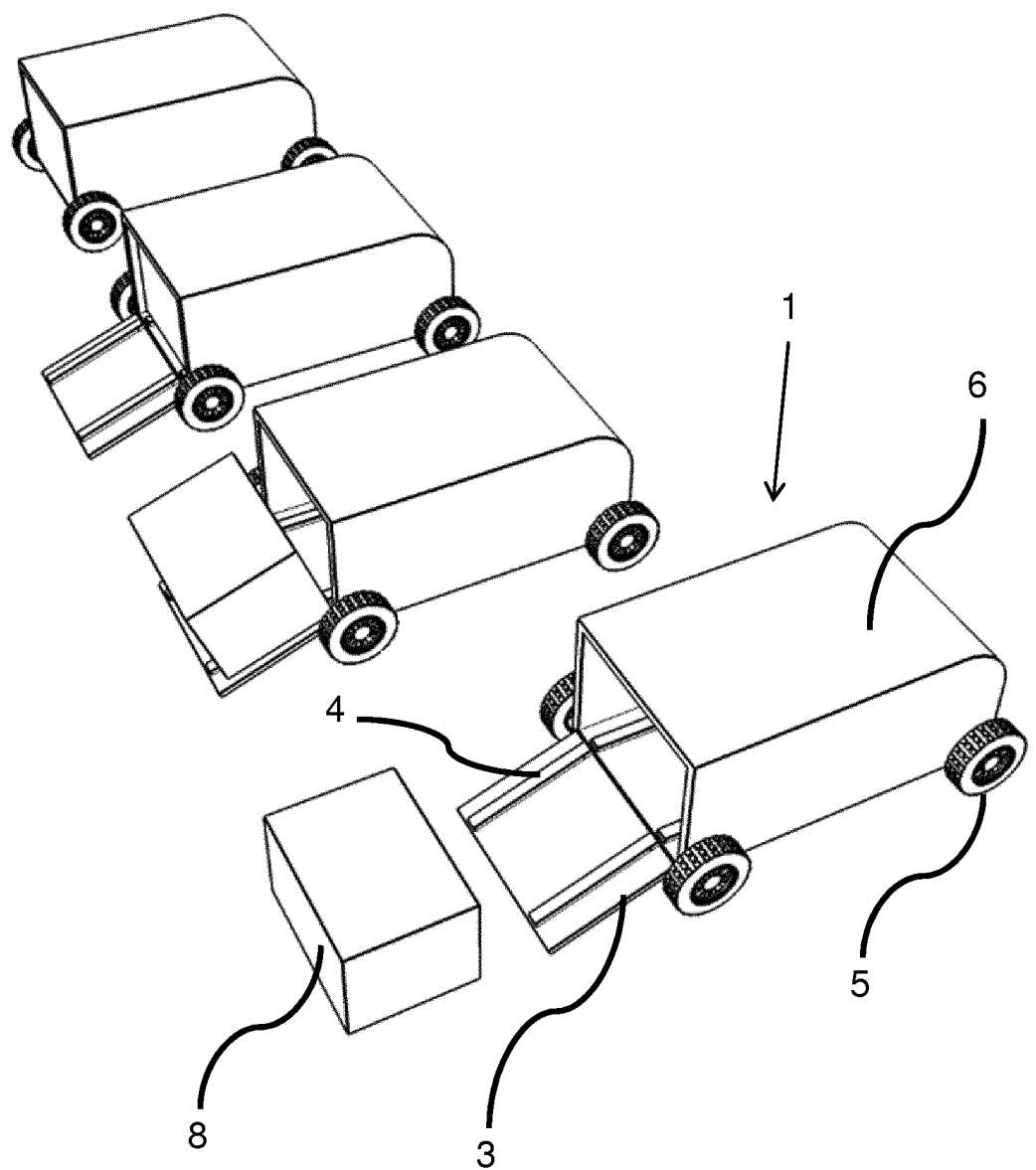
FIG. 3a shows a number of schematic perspective views of a vehicle in accordance with a first embodiment of the invention, the vehicle comprising ramp means enabling the or each box of FIG. 1 to be deposited from the vehicle to a customer's chosen location.

In a preferred aspect as shown in FIG. 3a, in the open position the panel or flap 3 forms a ramp which the container containing the item or items 8 slide or roll down to leave the compartment 2 which ensures the one or more containers are ejected gently to avoid damage to their contents. The flap 3 may comprise suitable conveyor means 4, for example a gravity conveyor or a powered conveyor.

Preferably the containers are rigid to protect their contents. Furthermore, the containers may comprise wheels 5 or roller means to aid rolling ejection from the container.

Figure 3B:
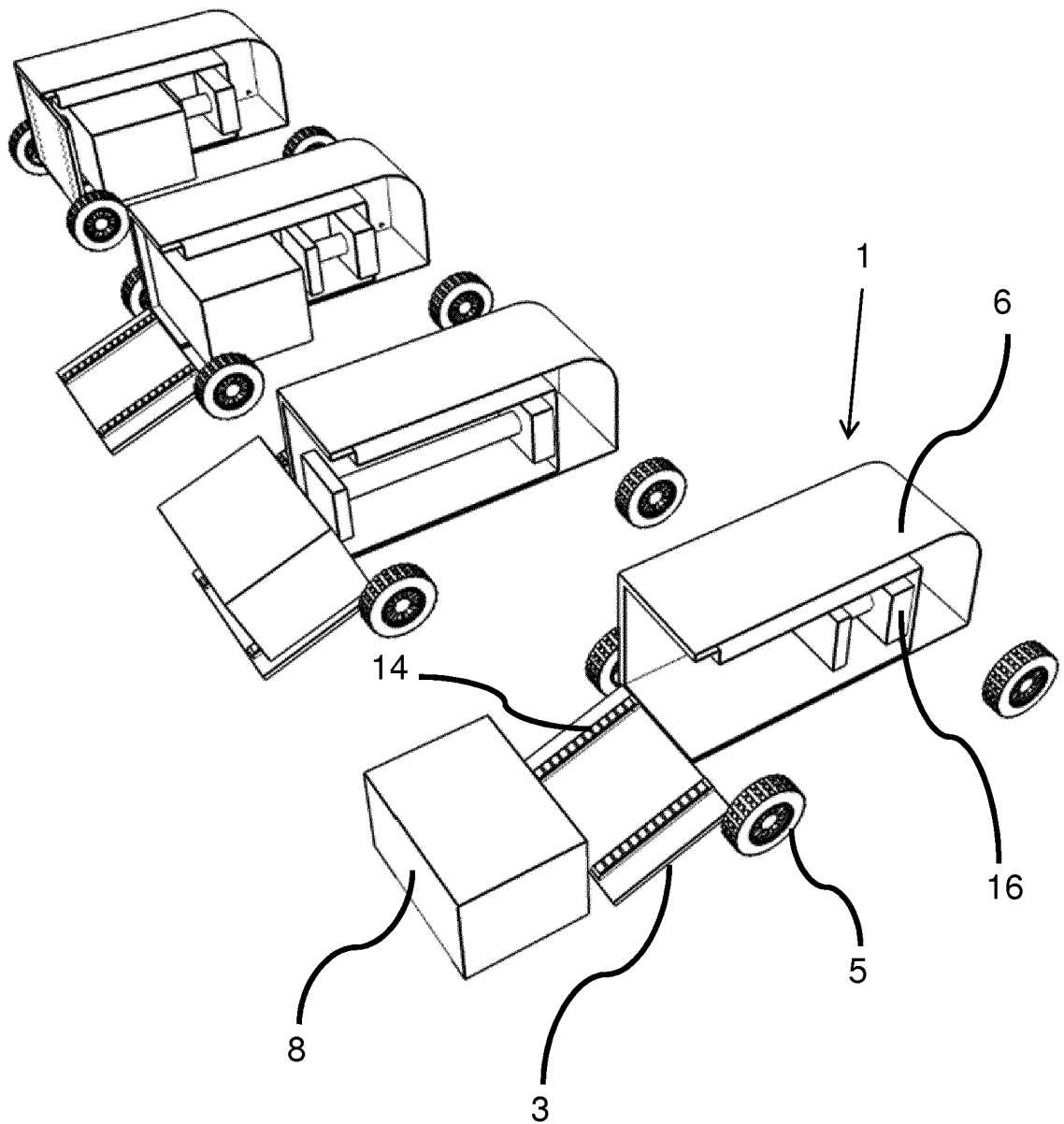
FIG. 3b shows a number of schematic perspective views of a vehicle in accordance with a first embodiment of the invention, the vehicle comprising alternative means for enabling the box of FIG. 1 to be deposited from the vehicle to a customer's chosen location.

Alternatively or additionally, as shown in FIG. 3b the one or more containers may be pushed out of the vehicle 1 by a ram or blade 16 or by a pressurised jet of air which urges the one or more containers from the compartment. By way of example only the ram or blade 16 may be moved by a motorised screw or hydraulics.

Furthermore, the containers may be suspended from a motorised screw (not shown) the rotary movement of the screw acting so as to dispense the containers from the vehicle 1.

Figure 4A:
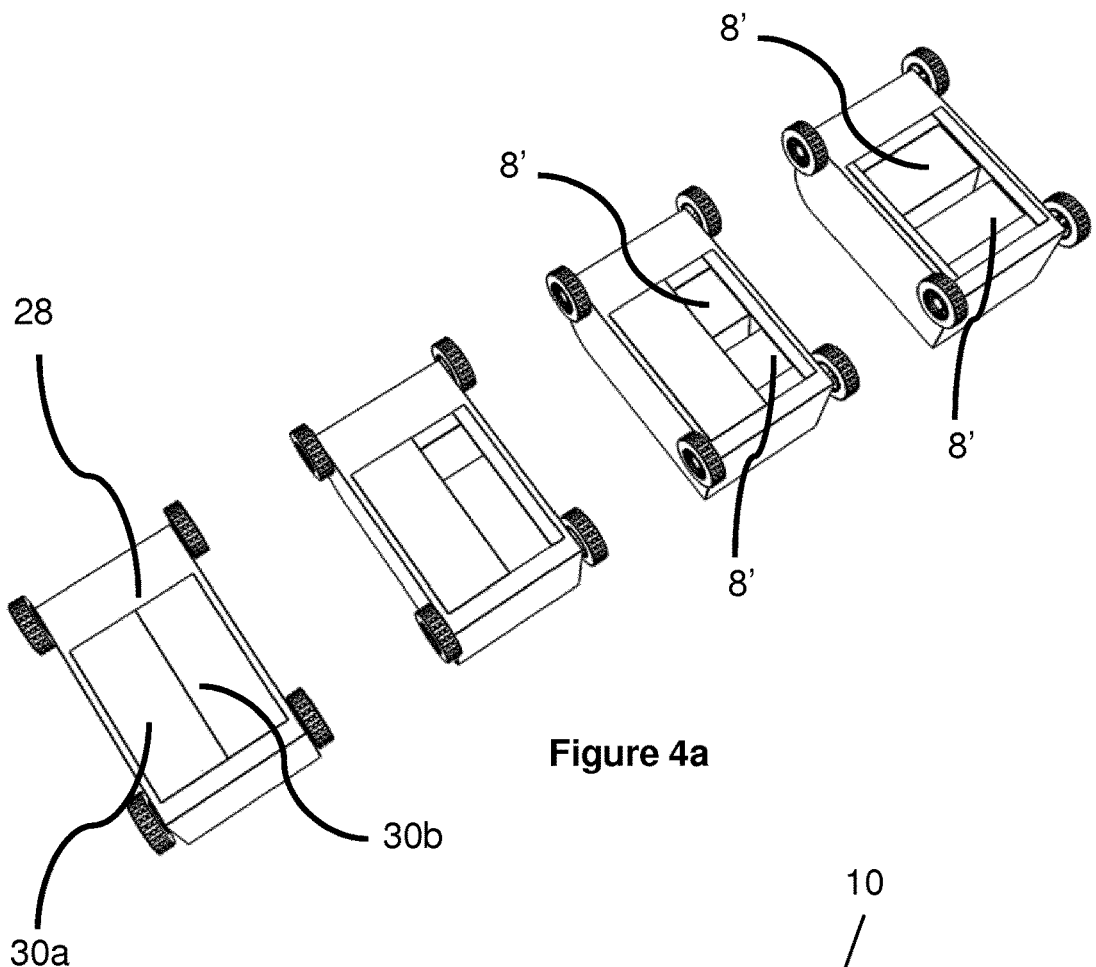
FIGS. 4a and 4b show a schematic perspective view of a vehicle in accordance with a further form of the invention, the vehicle comprising alternative means for depositing boxes containing customer orders from the underside of the vehicle.
Figure 4B:
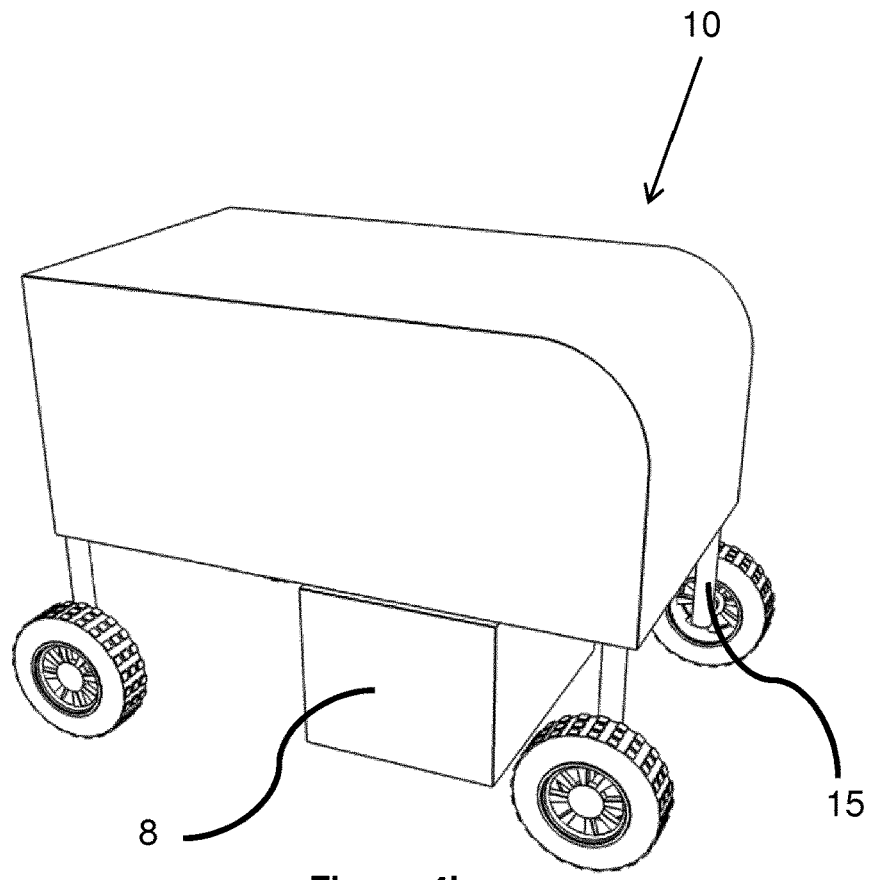

In another embodiment of the invention, the vehicle 10 as shown in FIGS. 4a and 4b, comprises a base 28, part or all of which comprises a movable platform 30a, 30b that may be moved from an open position to a closed position. The one or more containers are positioned on top of the moveable platform 30. Whilst the autonomous vehicle 10 is in transit the base 28 is in the closed position, on arrival at the delivery location the platform is moved in to the open position to allow the containers to be deposited on the ground. The containers are then dispensed gently onto the ground through the opening in the base 28, or by tilting the platform 30 so that the containers roll or slide off a side off the platform.

It will be appreciated that in this embodiment, the vehicle 10 may need to be raised in order to negotiate around the deposited items 8. In this regard, and as shown in FIG. 4b, the vehicle 10 may comprise raisable wheel and suspension means.

In this way even delicate or fragile items can be safely dispensed from the vehicle without risk of damage.

Figure 5:
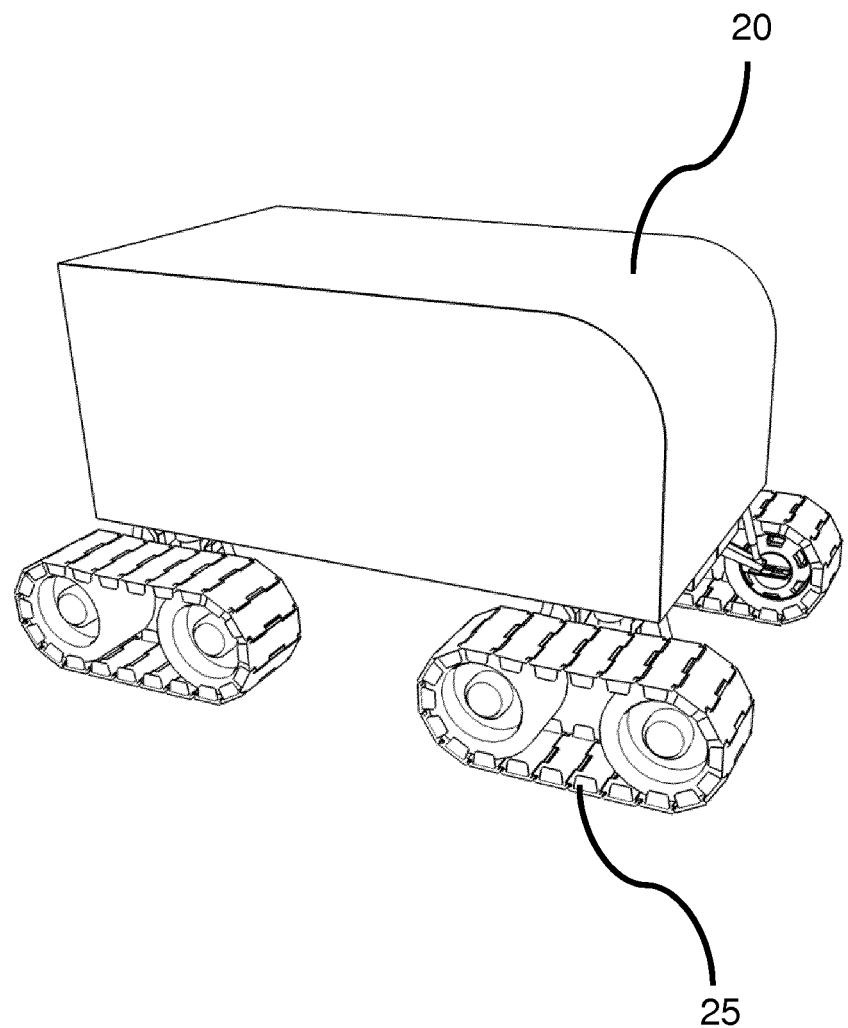
FIG. 5 shows a schematic perspective view of a vehicle in accordance with a further form of the invention, the vehicle comprising tracks in place of wheels.

FIG. 5 shows a further embodiment of the invention. As shown in FIG. 5, the body of the vehicle 20 is mounted on track-type wheels 25 rather than conventional wheels. It will be appreciated that these tracks provide better traction and may be appropriate for more difficult surfaces that the vehicle must traverse. It will be appreciated that not all the wheels need to comprise track-type wheels, it is possible that only the front or rear wheels comprise track-type wheels. Furthermore, the wheels may comprise two sets of tracks disposed on the vehicle rather than track-type wheels replacing the four wheels on the vehicle.

Figure 6A:
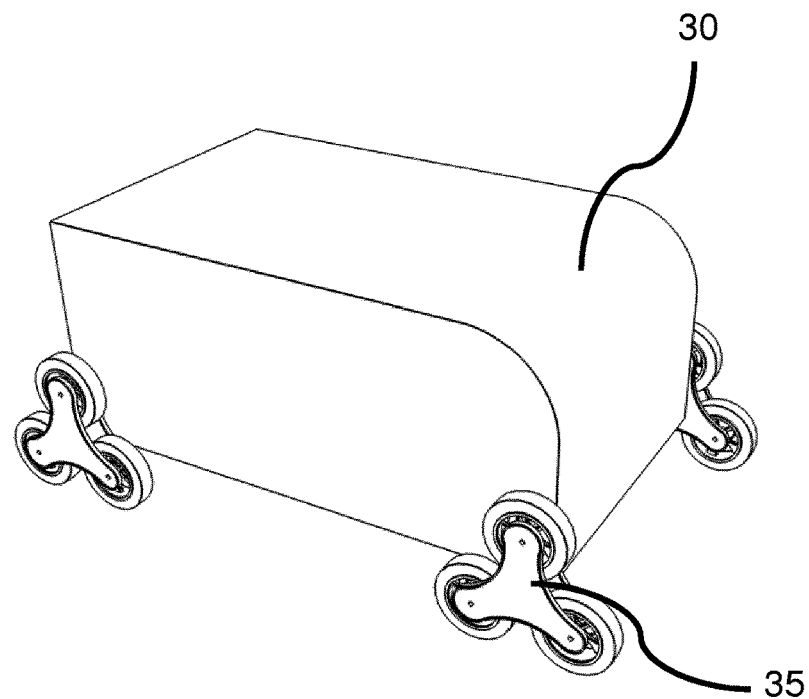
FIGS. 6a and 6b show a schematic perspective views of a vehicle in accordance with a further for of the invention, the vehicle being provided with means for climbing stairs.
Figure 6B:
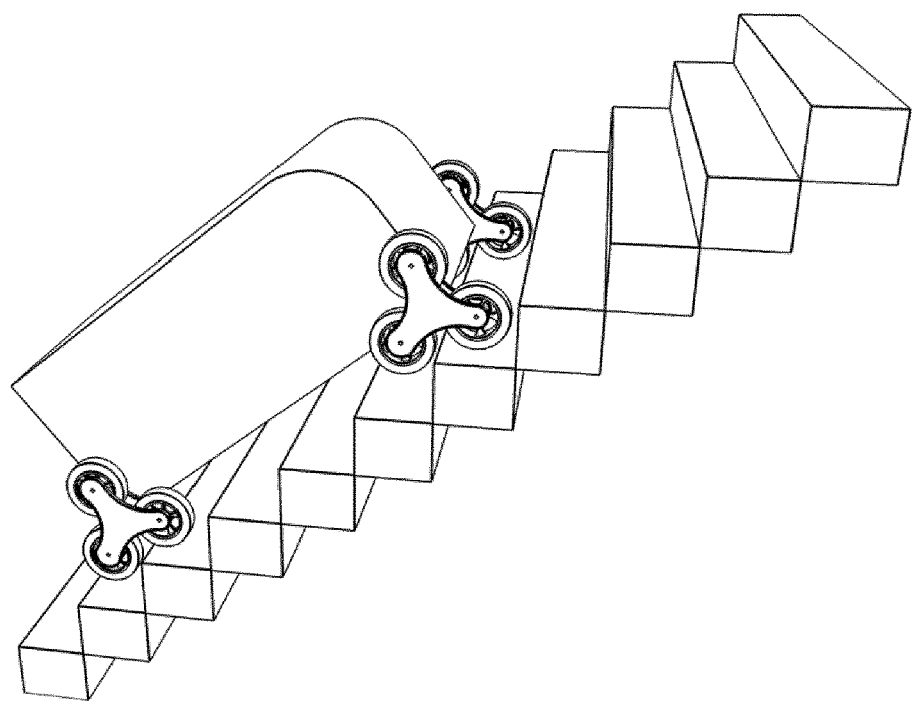

FIG. 6 shows a further embodiment of the invention. As shown in FIGS. 6a and 6b, the vehicle 30 is mounted on an alternative set of wheels 35. These wheels enable the vehicle 30 to climb stairs.

It will further be appreciated that the autonomous vehicle as described with reference to FIGS. 1 to 6b may be provided with the means to negotiate lifts, escalators or other conveyance means, either independently or under the control of the central delivery hub and control location.

In a second embodiment of the invention, with reference to FIGS. 7a to 12, the remotely controlled autonomous delivery vehicle takes the form of a drone type platform such as a quadcopter. It will be appreciated that any form of drone type platform may be envisaged such as a helicopter or a remotely controllable aircraft. Items corresponding to those in the embodiment described above will be referenced with the same reference numerals.

Figure 7A:
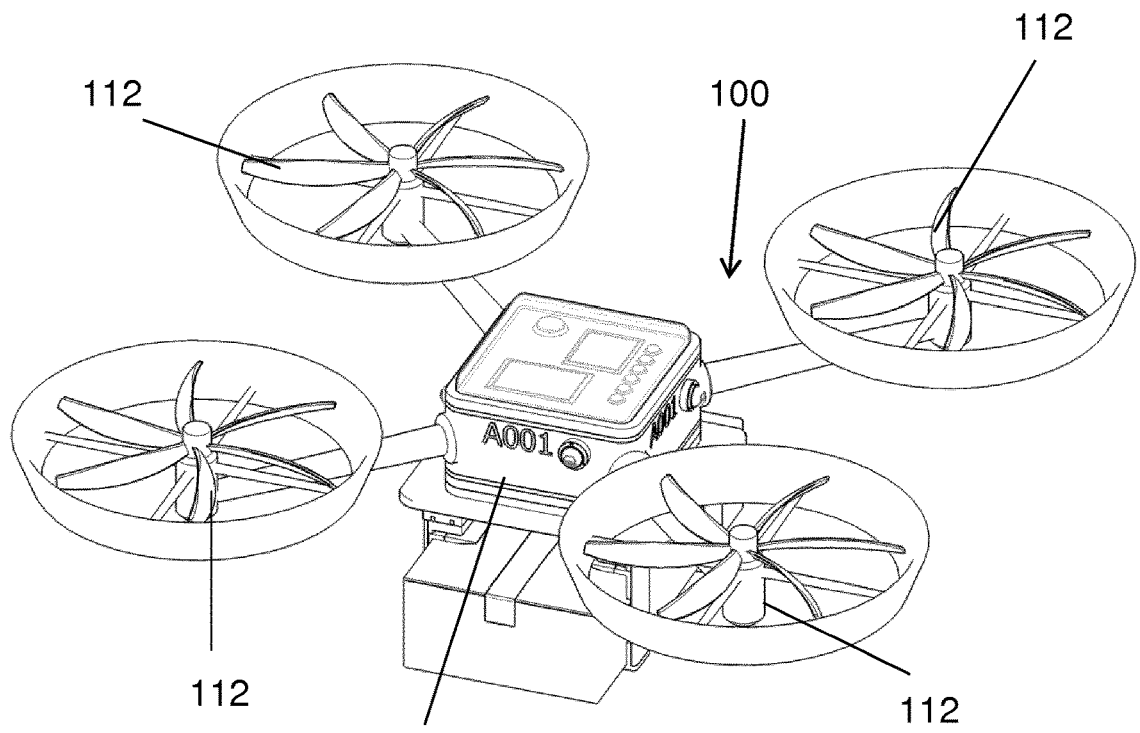
FIG. 7a shows a schematic perspective view of a further form of autonomous vehicle in accordance with one form of the invention, the vehicle comprising a drone platform carrying boxes or the like for delivery to a customer.
Figure 7B:
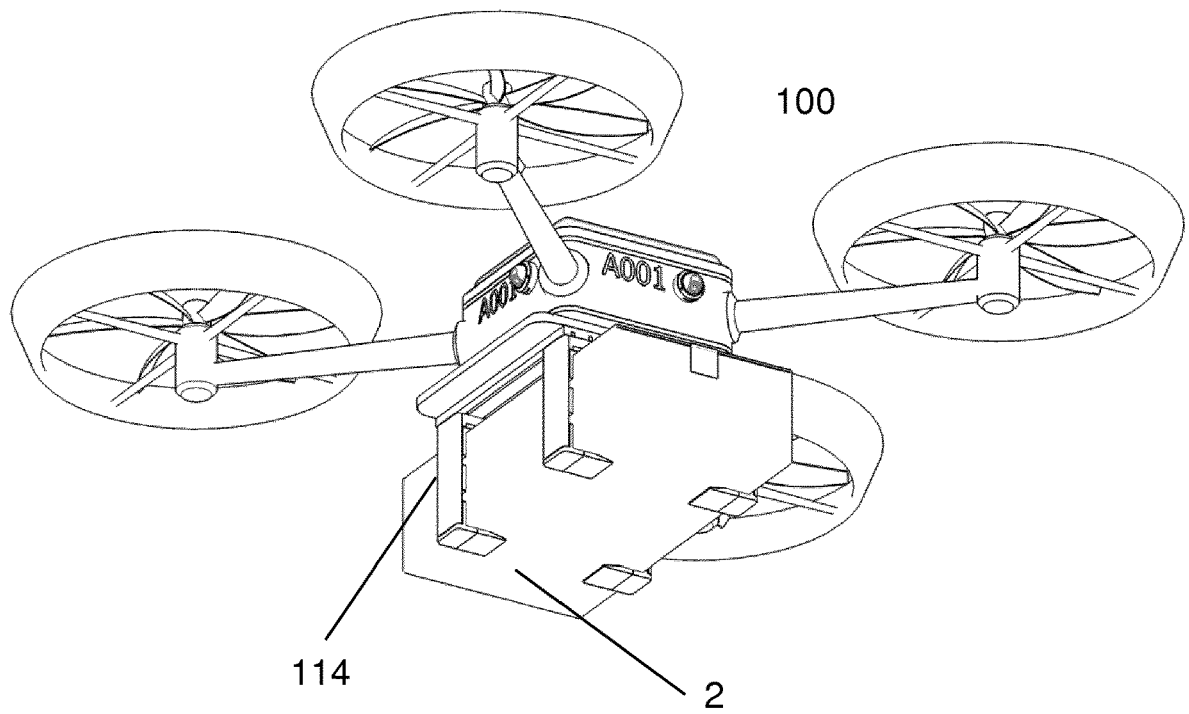

As shown in FIGS. 7a and 7b the autonomous vehicle 100 comprises a drone body driven by a motor linked to four propeller means. The drone body further comprises means for carrying a delivery container 2. As shown in FIGS. 7a and 7b this may comprise a box-type container secured to the underside of the drone platform by releasable attaching means 114. It will be appreciated that the embodiment shown in FIGS. 7a and 7b is one form of delivery container 2 only and that any suitable way of releasably securing any form of deliver container 2 to the platform may be envisaged.

Each delivery container 2 is shaped and sized to receive items 8, said items 8 comprising goods ordered or to be delivered to a customer for example, one or two bags of groceries, a parcel or other items comprising a single customer order.

The item or items 8 for delivery are retained in suitable carrying means such as a reusable or recyclable bins, crates, boxes, or bags or like or a holder which is placed in the delivery container 2. It will be appreciated that the carrying means may be any suitable form of carrying means and is not limited to these examples. Furthermore, some items for delivery may not require carrying means, for example parcels shipped by online retailers in boxes need not be placed in carrying means within a delivery container 2 but may be releasably attached directly to the body of the drone via suitable securing means.

It will further be appreciated that the delivery container 2 may comprise an insulated material (not shown) to maintain the temperature of the contents of the container. Optionally, the container may comprise cooling means such as, by way of example only, a chilled or frozen ice-pack containing a coolant fluid. In an especially preferred embodiment the iced pack may be frozen water.

Individual orders placed by customers, or parcels for delivery are pre-loaded into containers 2 at a delivery hub.

The delivery vehicle 100 then travels autonomously to the delivery location 120.

On reaching the delivery site 120 the releasable attaching means 114 on the drone 100 releases the delivery container 2 automatically to, at, in or onto the customer's desired location.

Figure 8:
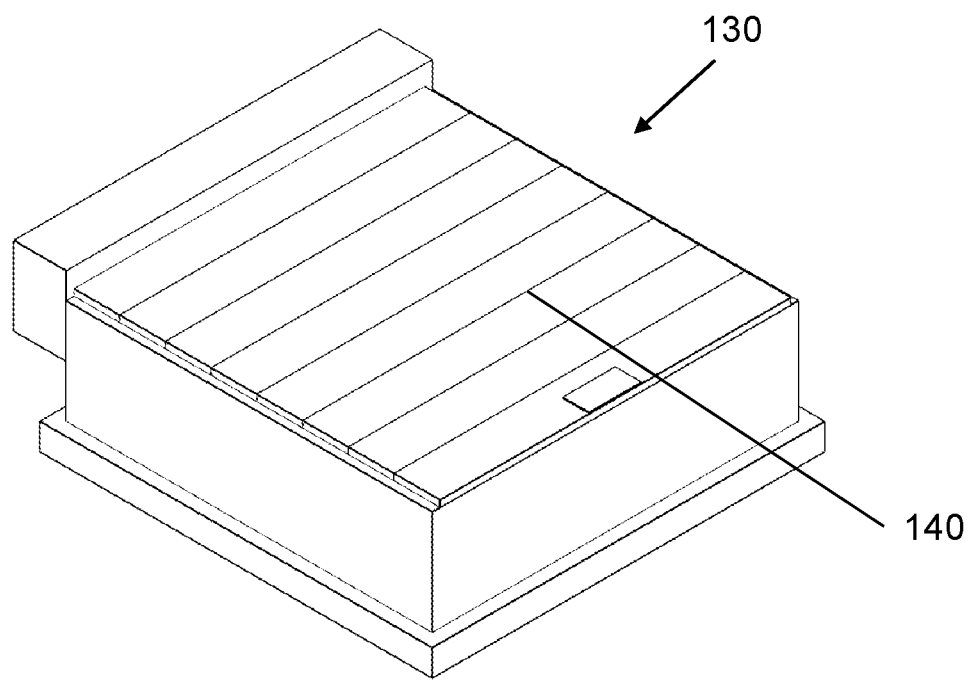
FIG. 8 shows a schematic perspective view of one form of securable drop off area suitable for use by the autonomous vehicle of FIGS. 7a and 7b.
Figure 9:
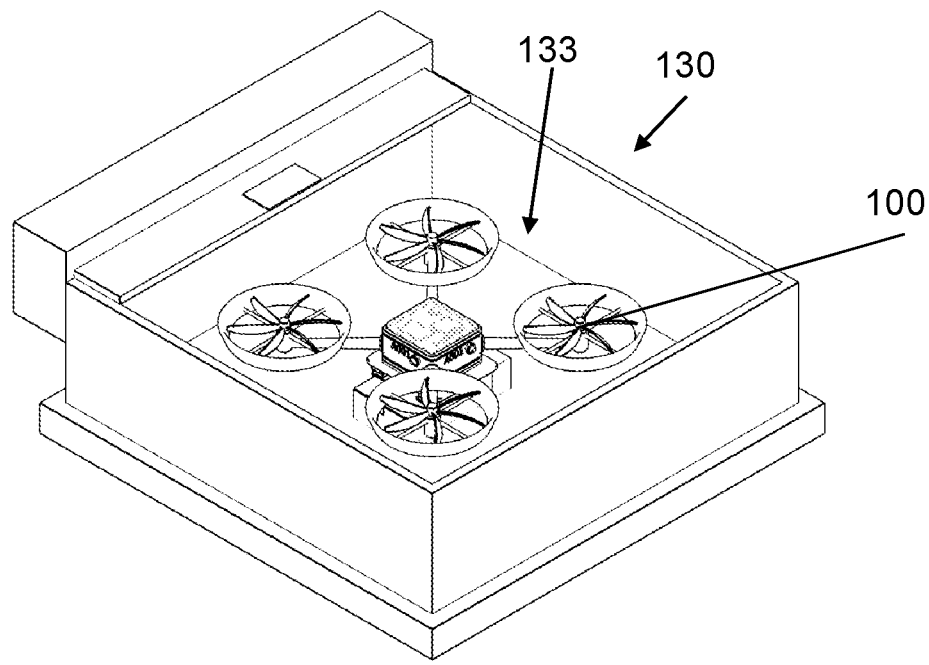
FIG. 9 shows a schematic perspective view of the autonomous vehicle of FIG. 7 in situ in the securable drop off area of FIG. 8.
Figure 8A:
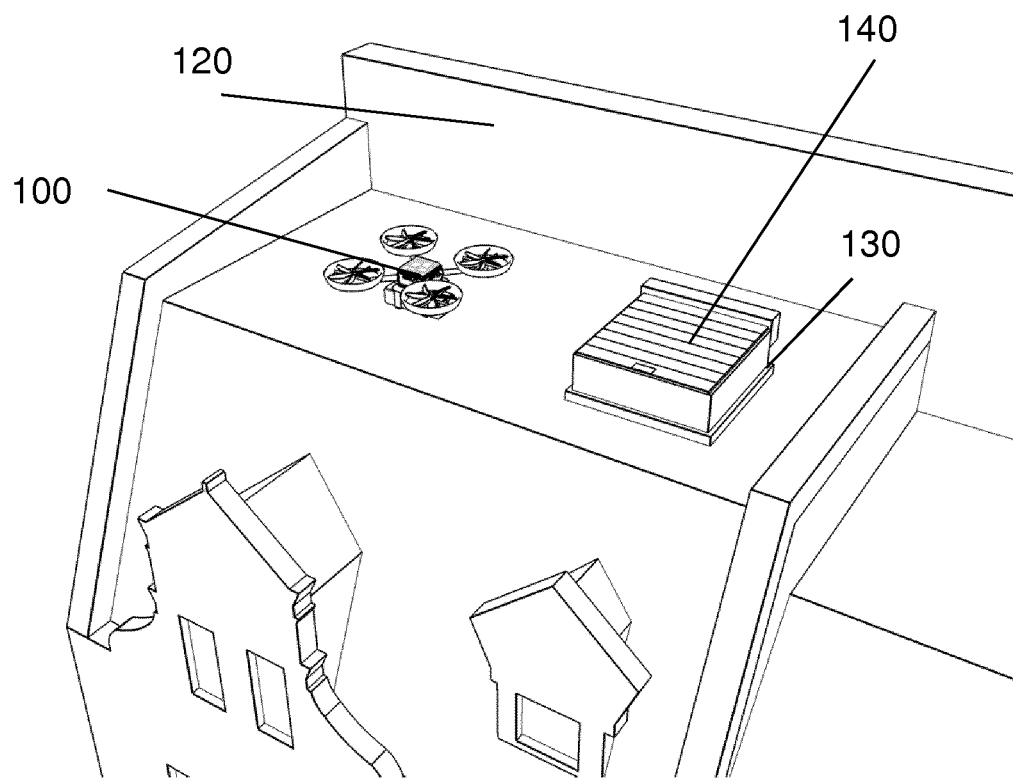
FIG. 8a shows the securable drop off area of FIG. 8 mounted on the roof of a building, the autonomous vehicle approaching the drop off to perform an unattended delivery.
Figure 9A:
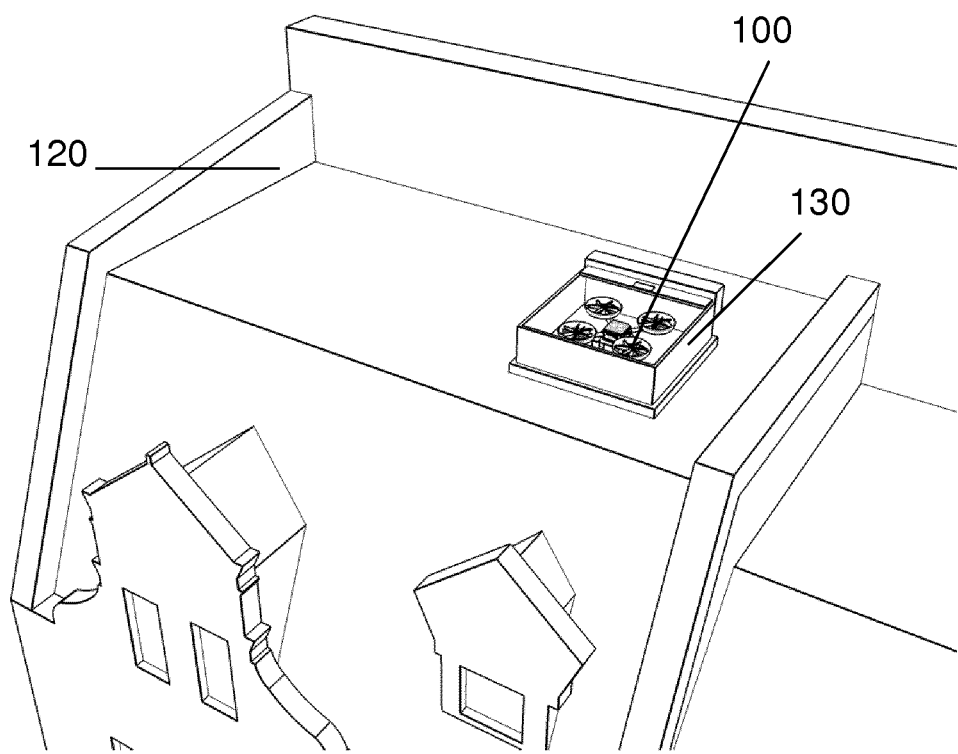
FIG. 9a shows a schematic perspective view of the autonomous vehicle of FIG. 7 in situ in the securable drop off area of FIG. 8a, on the roof of a building.

By way of example only, one form of securable delivery location 130 in shown in FIGS. 8, 8a, 9 and 9a. The securable location 130 may comprise a location only accessible to the customer, for example on the roof of their delivery address. As shown in FIGS. 8 and 9 the location comprises a receiving box having a lid 140 moveable from a first closed position to a second open position. When the delivery drone 100 approaches the receiving box, opening means comprising suitable drive means, act so as to move the lid from the normally closed position to the open position such that the drone 100 may land and deposit the delivery container 2 secured thereto.

It will be appreciated that the drone 100 may be provided with suitable transmitter means to activate the opening means on the receiving box. Alternatively, the receiving box may be remotely openable by an operator located at the central hub from which the drone 100 departed. Furthermore, the customer may program the receiving box to open and/or close at specific times in the day to receive deliveries.

Once the drone 100 is safely located in the receiving box, which may be monitored by camera means (not shown) located within the box, the delivery container 2 is released from the body of the drone 100. The delivery container 2 remains in the receiving box and the drone 100 is remotely commanded to take off and return to the central hub to be refilled, charged and sent on a further delivery. Once the drone 100 has departed the lid 140 of the receiving box 130 moves to the closed position thereby securing the delivery container 2 until the customer wishes to access it.

Optionally a message may then be sent to the customer advising that the order has been delivered. The customer can then retrieve the order from their desired location at their convenience.

It will be appreciated that this gives the customer the ability to securely receive delivery items to unattended locations. This may be particularly relevant for high value items such as electronic goods or clothes or for items carrying an age limit for purchase.

Figure 10A:
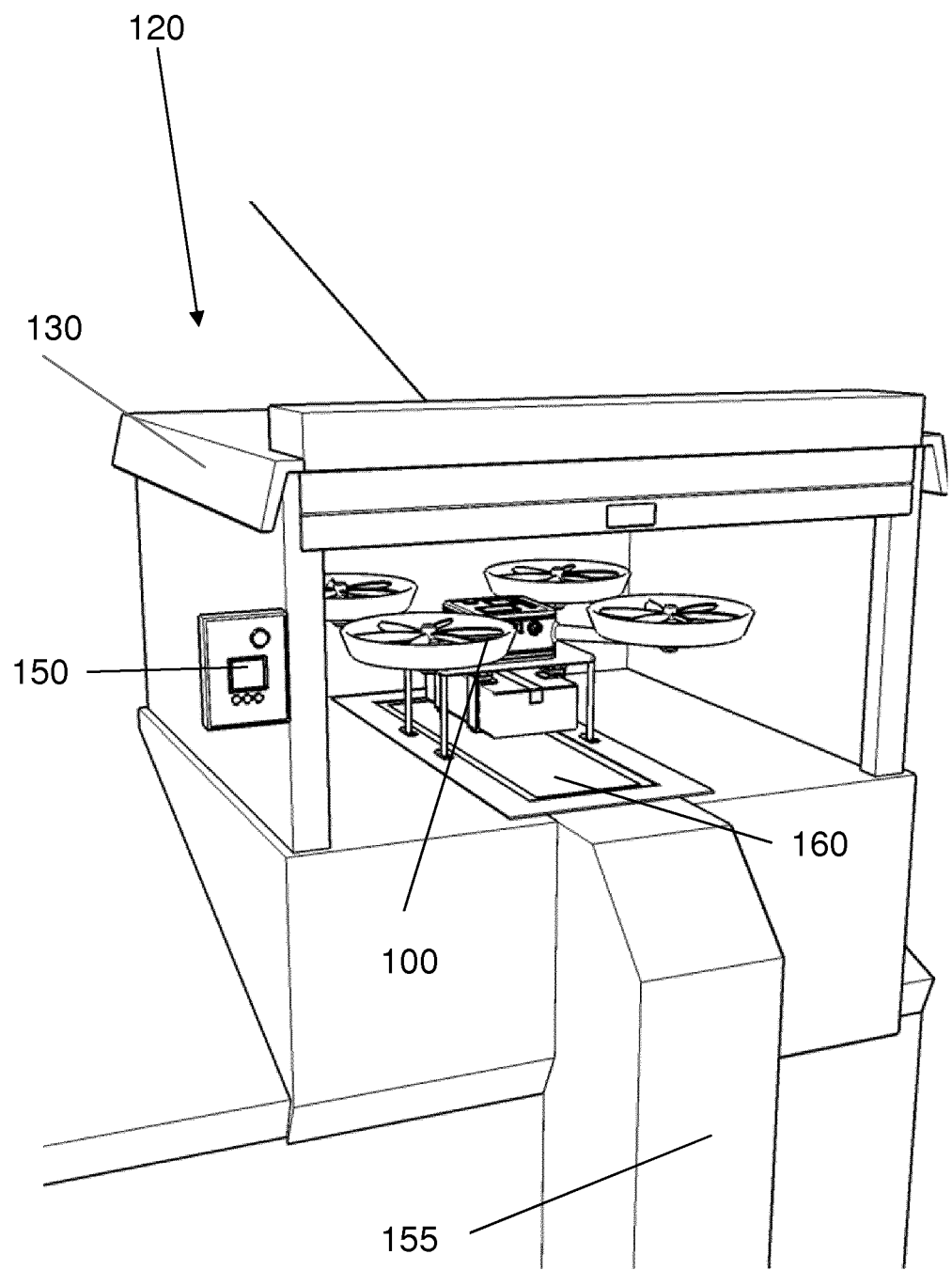
FIG. 10a shows a perspective schematic view of a further form of securable drop off area for the autonomous vehicle of FIG. 7, showing the autonomous vehicle in situ in the securable area.
Figure 10B:
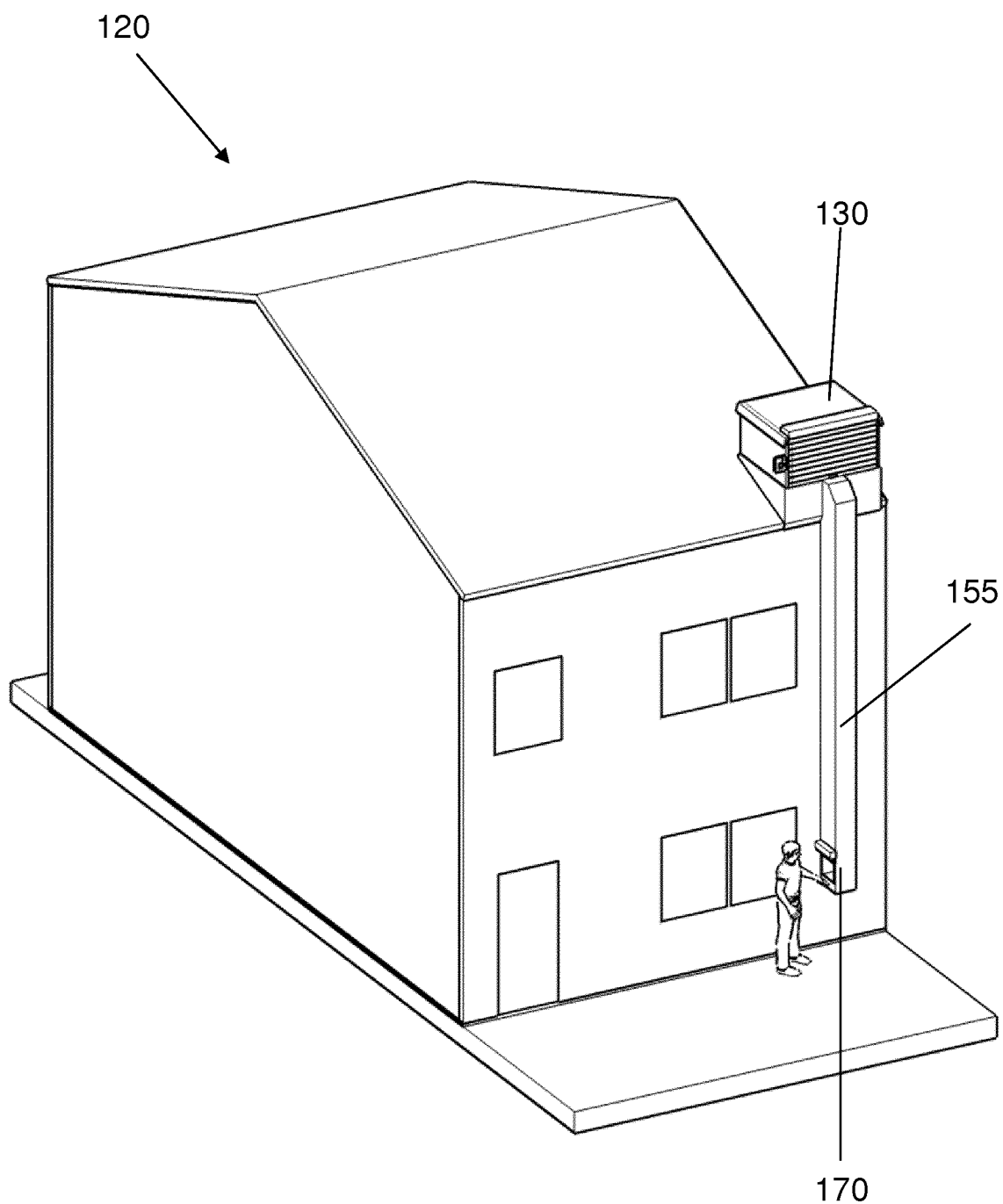
FIG. 10b shows a schematic perspective view of the securable drop off area of FIG. 10a, showing one mechanism in accordance with the invention enabling the autonomous vehicle to enter the secure drop off area and deliver goods to the customer.
Figure 10C:
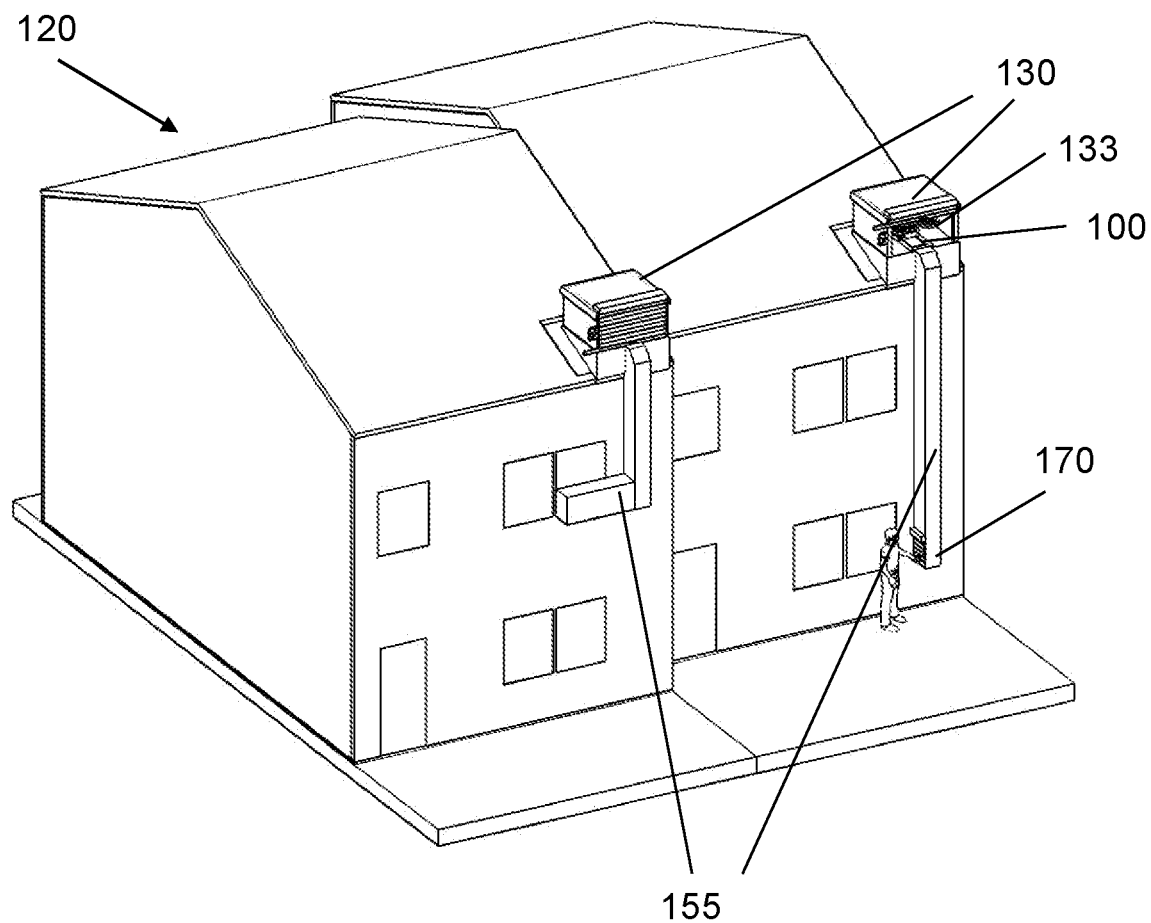
FIG. 10c shows two securable drop off areas in situ on buildings, each drop off area being connected to a secured delivery area accessible from the interior of the building or from street level.

In FIGS. 10a, 10b and 10c an alternative form of secure delivery location 110 is shown. In this embodiment the receiving box 130 is located such that the openable portion of the receiving box comprises one of the substantially vertical sides of the box. In this way, when open, the box is not at risk of collecting water or debris to the same extent as the embodiment described with reference to FIGS. 7a and 7b. In the same manner described above, the openable portion of the receiving box is openable remotely either from receiving a signal from an incoming delivery drone 100 via suitable signal receiving means 150 or via a signal transmitted from the central hub.

It will be appreciated that the signal receiving means may comprise a proximity detector located on the box 130 and the drone 100.

In the embodiment of receiving box shown in FIGS. 9 and 10c, the interior 133 of the receiving box 130 may be connected to the interior of the property on which it is mounted or to an associated secured delivery container 130. For example, the receiving box may be mounted on existing but unused chimney stacks on properties and chutes 155 located within the old chimney, the drone 100 landing in the receiving box above the chute 155, the delivery container 2 then being released by the drone 100 down the chute 155 to a safe location within, adjacent or accessible from the property. The chute 155 may further comprise an openable panel 160 located within the receiving box so as to only allow the delivery container 2 to be delivered in to the property, the drone 100 being provided with means for opening the panel 160 as required. The panel 160 may pivot, roll, slide or concertina in order to move from a closed position where the chute 155 is inaccessible to an open position where the chute 155 may be accessed. Again, the interior of the receiving box 130 may be monitored by camera means to ensure safe and secure delivery of the container 2 in to the chute 155.

As shown in FIGS. 10a, 10b and 10c, the chute 155 may comprise means to transfer the delivery container 2 from the receiving box 130 to a secured location either within the property on which it is mounted or to a secured location 170 mounted on the exterior of the property that is accessible, for example, at ground level.

Furthermore, the chute means 155 may comprise multiple chutes 155 capable of receiving multiple delivery containers 2 or parcels in separate deliveries. In the case of multiple chutes 155 as shown in FIG. 11, it will be appreciated that the receiving box 130 requires means for discriminating between the deliveries and accordingly apportioning them to the correct chute 150.

One form of suitable means for achieving this is shown in FIGS. 12a and 12b. In this example, the receiving box 130 is provided with a sorting mechanism 180. In this example, the receiving box 130 comprises a moveable platform 190 that in use extends laterally to form a landing platform for the drone external to the receiving box 130. The landing platform comprises a substantially flat surface having a slot therein sized so as to allow a delivery container 2 to pass therethrough. The slot is positioned within the platform 180 such that when the platform is retracted within the receiving box 130 it locates above a lift mechanism 200. The lift mechanism 200 is positioned such that when operable, it may lower any item thereon to a sorting level 210 within the receiving box 130. The sorting level 210 comprises means for directing items to the appropriate chute 155 for transmission in to the property or other secure location. It will be appreciated that in this way, chilled deliveries may be separated from parcel deliveries.

Preferably the delivery containers 2 are rigid to protect their contents. Furthermore, the containers 2 may comprise wheels 5 or roller means to aid rolling ejection from the vehicle or to assist delivery.

It will be appreciated that the autonomous vehicle in any of the embodiments described above may be provided with means for unlocking secured doors such as by electromagnetic means, coded RF means or any other remote sensing and detecting technology.

It will be appreciated that the autonomous drone delivery vehicle may drop the delivery in to a chute from where it is transferred in to a secured container or delivery box, the chute need not be secured as long as the eventual delivery container is securable.

It will be appreciated that an autonomous delivery vehicle in accordance with all forms of the invention described above, may perform a single delivery then return to the delivery hub to be reloaded and if necessary recharged. Alternatively, a single vehicle having several compartments may perform several deliveries before returning to the delivery hub.

Moreover, it will be appreciated that the one or more containers in a single compartment may be ejected to a single delivery location. However, a single order may comprise the contents of one or more compartment or for large orders, several delivery vehicles may be dispatched to the same delivery location. However, a single order may be contained in one or more adjacent compartments.

It will further be appreciated that a single autonomous vehicle can be loaded with multiple separate orders.

In accordance with further aspects of the invention, the delivery site or sites can be located using GPS. Additionally or alternatively markers may be issued to customers in advance which can be placed at the desired location within the delivery site to guide the autonomous delivery vehicle thereto.

The invention claimed is:

1. A receiving box for receiving deliveries of goods from an autonomous aerial vehicle, the receiving box comprising:
   a cavity having a portion moveable from a first position in which the cavity is inaccessible, to a second position in which the cavity is externally accessible by the autonomous aerial vehicle, the moveable portion being provided with opening means; and
   signal receiving means;
   the opening means being configured to prevent the moveable portion from being moved from the first position to the second position, the opening means being configured to be releasable on the signal receiving means receiving a signal from a transmitter associated with an autonomous aerial vehicle, at least a second portion of the cavity being configured and arranged to be accessible to at least a portion of a delivery the autonomous aerial vehicle;
   the opening means being configured such that the moveable portion will be moveable from the first position to the second position in response to the signal receiving means receiving a signal to accept the delivery from the autonomous aerial vehicle in to the cavity, and such that the moveable portion will return from the second position to the first position once the delivery is complete thereby enabling the receiving box to accept the delivery from the autonomous aerial vehicle in to the cavity, and the receiving box including a moveable platform configured to move laterally between an extended position to form a landing platform for the autonomous aerial vehicle external to the receiving box and a retracted position where it is held within the cavity.

2. A receiving box according to claim 1, in which the opening means is configured to be releasable on the signal receiving means receiving a signal from a transmitter associated with the user.

3. A receiving box according to claim 1, comprising:

a distributing means that includes sorting means configured for separating goods of different predetermined categories and transferring each category of goods in to further secured locations associated with the user.

4. A receiving box according to claim 1, in which the moveable portion is configured to be moved from the first position to the second position by sliding, pivoting, or rolling.

5. A receiving box according to claim 1, in combination with an autonomous aerial vehicle which comprises:

a platform configured as a drone, a quadcopter, a helicopter or flying vehicle.

6. A receiving box according to claim 1, configured to operate with regard to a delivery of goods or items ordered for delivery within a predetermined time slot.

7. A receiving box according to claim 1, configured to operate with regard to a delivery of an unsolicited parcel or delivery.

8. A receiving box according to claim 1, configured to be mounted on a roof of a delivery location.

9. A receiving box according to claim 1, comprising:

chute means configured for receiving a delivery from an autonomous vehicle, the chute being linked to the secured container.

* * * * *